May 7, 1935.　　　　F. R. HIGLEY　　　　2,000,465
VEHICLE DRIVE
Filed Jan. 20, 1933　　　2 Sheets-Sheet 1
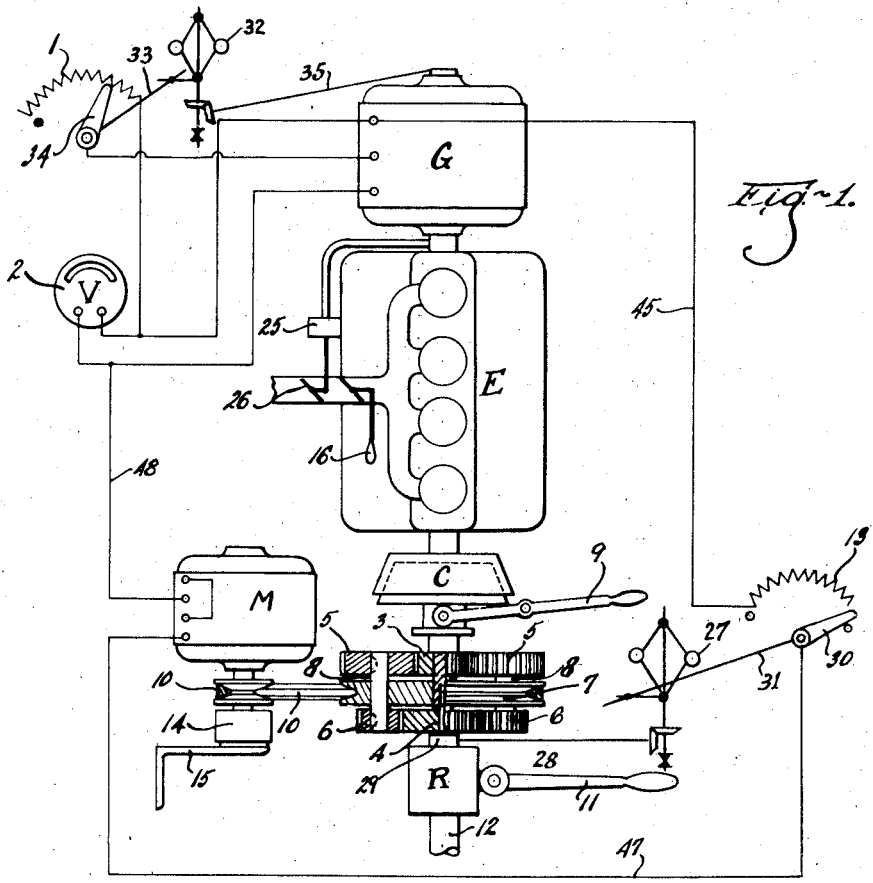
Fig. 1.
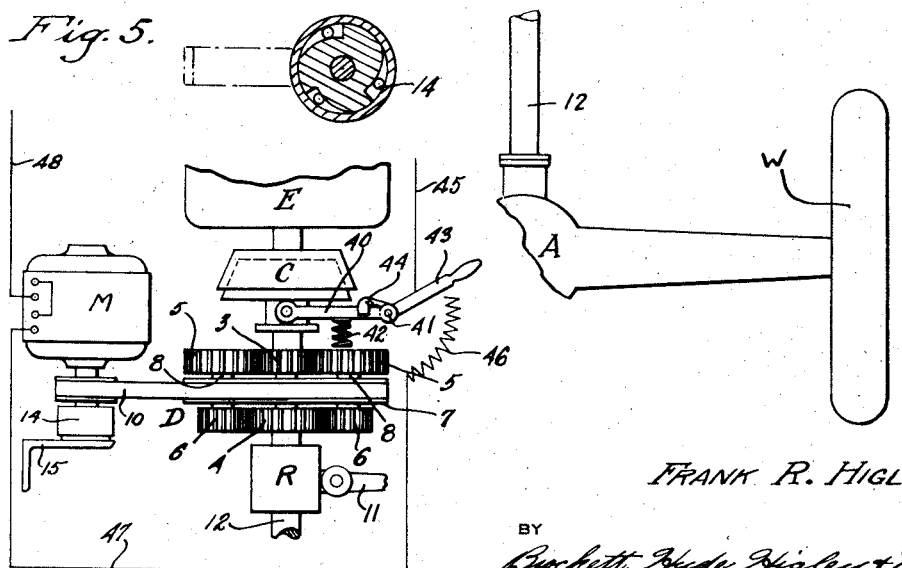
Fig. 5.
Fig. 2.
INVENTOR
FRANK R. HIGLEY
BY
Buckett, Hyde, Higley & Meyer
ATTORNEYS May 7, 1935.　　　F. R. HIGLEY　　　2,000,465
VEHICLE DRIVE
Filed Jan. 20, 1933　　　2 Sheets-Sheet 2

INVENTOR
FRANK R. HIGLEY
BY
Brockett, Hyde, Higley & Meyer
ATTORNEYS

Patented May 7, 1935

2,000,465

UNITED STATES PATENT OFFICE 2,000,465

VEHICLE DRIVE

Frank R. Higley, Cleveland Heights, Ohio

Application January 20, 1933, Serial No. 652,669

17 Claims. (Cl. 172—239)

This invention relates to means for transmitting the power of an internal combustion engine or the like, to its load, the engine being in operation, and the load being a variable one to be driven at various speeds from a standstill condition.

The invention contemplates the combination of an engine, a generator constantly driven thereby, a motor to be driven by the generator, and differential gearing between the engine, the motor and the load, whereby the load is differentially driven.

The objects of the invention are to simplify the operation of the parts and particularly their control by the operator, and to make the apparatus function substantially automatically in coordinating the speeds of the engine and motor with respect to the load.

The invention is particularly applicable to self-propelled vehicles having a type of drive such as that shown in my copending application, Serial No. 650,959, filed January 10, 1933, in which the traction wheels comprise the load to be driven by the engine of the vehicle. In such a vehicle application the objects of this invention are to provide superior control of locomotion.

Figure 3:
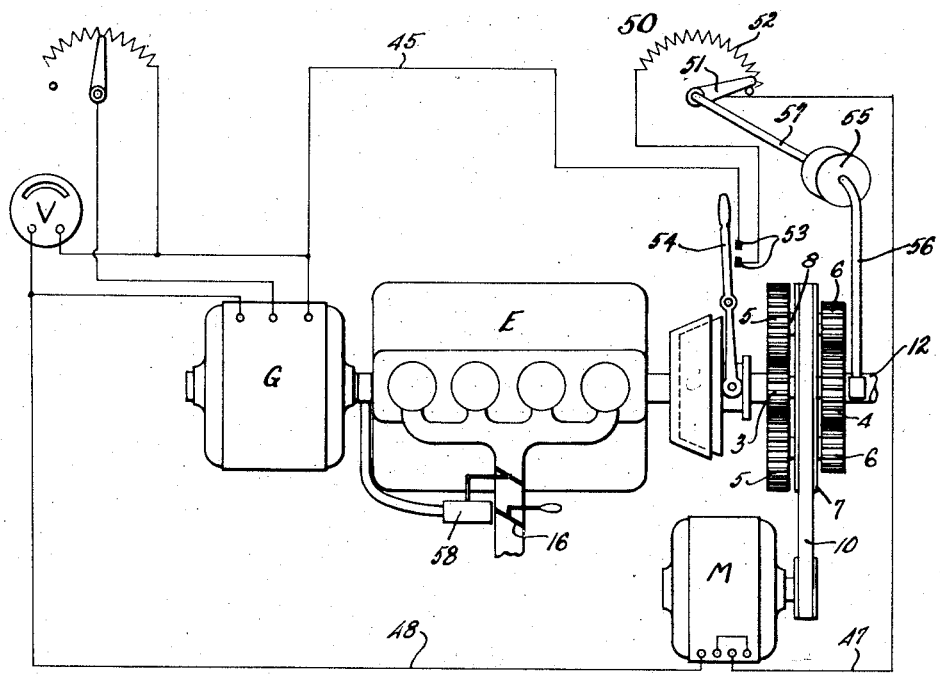
Figure 4:
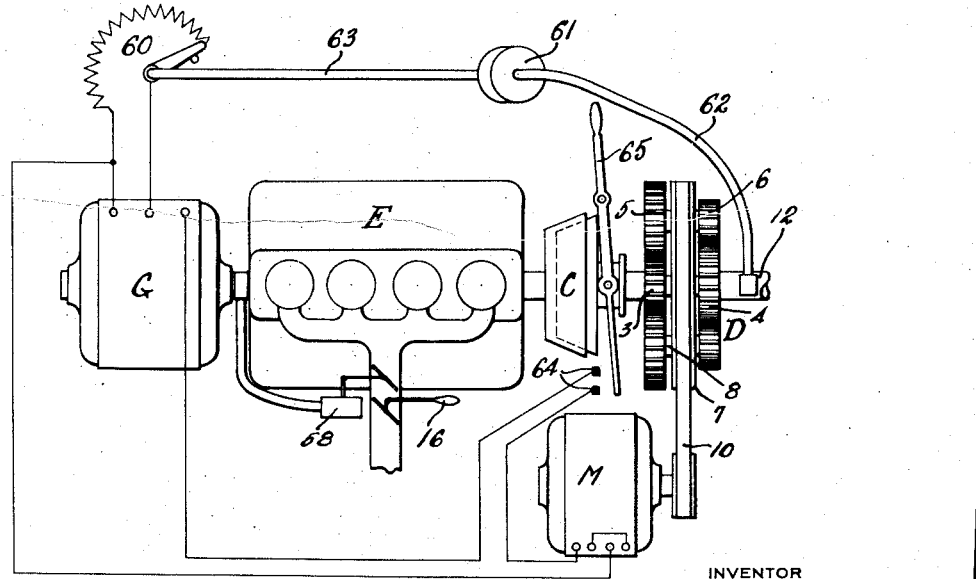

The exact nature of the invention, together with further objects and advantages thereof will be apparent from the following description taken in connection with the accompanying drawings, which are largely diagrammatic and otherwise conventionalized showings of elementary embodiments of the invention, and in which more particularly Fig. 1 represents the principal driving elements of a vehicle in which the invention is embodied, the arrangement being one for full automatic control of the transmission means; Fig. 2 is a detail view illustrating the pertinent parts of a modification of the arrangement indicated Fig. 1, the arrangement being one in which manual control of the transmission means is had; Fig. 3 is a modification of the arrangement shown in Fig. 1, also for full automatic operation; Fig. 4 is another modification providing for low voltage control, and Fig. 5 is a sectional detail of the overrunning clutch means appearing in Fig. 1.

With reference now to the form ilustrated Fig. 1, E is the engine and W are the wheels to be driven thereby, it being understood that these are parts of a vehicle, associated by the usual frame, etc., not illustrated as being well known in the art and forming no part of the present invention. The wheels thus comprise, in this illustration, the load to be driven by the engine.

G is an electrical generator arranged to be continuously driven by the engine as by the direct connection indicated. The capacity of the generator is substantially less than that of the engine, say one-third; and the generator is preferably of shunt characteristics, may be compound wound, and provided with a rheostat 1 and associated voltmeter 2 whereby its field excitation may be controlled through the connections indicated, as will be well understood by one familiar with the art.

D represents generally a differential gearing here shown as having an input element 3 in the form of a pinion, an output element 4 in the form of a gear, gears 5 meshing with the pinion 3, pinions 6 meshing with the gear 4, and a second input element 7 here shown as peripherally grooved to serve as a pulley. Each gear 5 and its pinion 6 are secured together against rotation, mounted on a shaft 8 carried by the pulley 7 and free to rotate in the latter. The arrangement indicated will be recognized as one wherein the gear 4, the output element of the differential D, is differentially driven by both the first input element, the pinion 3, and the second input element, the pulley 7; and it will be understood that the parts are mounted in suitable bearings for the purpose, for example that the elements 3, 7 and 4 are mounted for alignment but independent rotation as in the usual differential arrangement.

The input element 3 is arranged to be driven by the engine subject to engagement of a clutch C controlled by a lever 9.

The second input element 7 is arranged to be driven by a motor M, the drive being here shown conventionally as through the belt 10.

The proportion and arrangement of the parts is preferably such that the leverage of the motor M upon the output element 4, with respect to the leverage of the input element 3 on the output element, is in inverse ratio to the power of the motor M, with relation to the power of the engine E less that of the generator G.

The output element 4 of the differential, in the case of a vehicle as chosen for illustration, is connected to a reverse gear R as by the shaft 29. A drive shaft 12 is arranged to be driven by the reverse gear R and to drive the axle A on which the traction wheels W are mounted. The reverse gear R is controlled as by a lever 11, and it will be understood that there are three conditions of the reverse gear parts with corresponding positions of the lever 11: a forward one wherein the shaft 12 will be driven in the same direction and preferably at the same speed as the gear 4; a reverse one in which the shaft 12 will be driven by the gear 4 but in the opposite direction; and a neutral position intermediate the forward and reverse positions in which there will be no driving connection from shaft 29 to shaft 12. The lever 11 is shown as in the neutral position.

The motor M is preferably of series type, approximately the capacity of the generator G, and is arranged to be driven by the generator, through the circuit indicated including a controller 13, line 46 leading from generator to controller, line 47 from controller to motor, and line 48 from motor to generator. The motor control need not include means for reversing the motor, and the arrangement is such that the motor will drive its differential input element only in a direction corresponding to that in which the other differential input element is driven by the engine. In other words, both engine and motor, and their differential input elements are arranged to have unidirectional driving effect upon the differential output element. Means are associated with the motor-driven differential input element 7 to prevent drive of that element in reverse direction by the other differential elements. Such means are here indicated as an overrunning or one-way clutch 14, having one of its members fixed as by the arm 15, its other member secured with the motor shaft, and means between the members providing that the motor is free to operate in its forward direction but its armature may not be rotated in the reverse direction. Such a clutch is old and well known in the art and has recently found extensive use to provide the so-called free-wheeling in the automotive industry. The elementary arrangement of the clutch is indicated in the fragmentary view thereof immediately below its showing at 14.

The engine E has throttle means which may be governor-controlled to fix the engine speed as is well understood in the art, or which may be arranged for hand control. The latter arrangement is indicated as to the throttle 16; and a governor 25 may be arranged to control a second throttle 26, responsive to engine speed, to prevent overspeeding of the engine.

The controller 13 is here shown as arranged for automatic operation responsive to the speed of the load. The load here constituting the wheels W, the controller is actuated responsive to the speed of the vehicle. To this end a governor indicated at 27 having a drive 28 as from the shaft 29 which connects the differential output element 4 with the reverse gear R, is connected with the contactor arm 30 of the controller 13, as by a rock shaft 31. The proportioning and arrangement of the parts is such that when the vehicle is stationary, the contactor arm 30 of the controller 13 will be off the indicated resistance of the controller, so that the motor M will not receive power from the generator G; and in fact will not receive power from the generator until the load has attained a certain substantial minimum speed; after which the contactor 30 will make a connection with the resistance to cut the motor into the generator circuit, and will gradually cut out resistance as the vehicle speed increases.

It being preferable that the voltage output of the generator G be maintained fairly constant, and to this end, particularly if the engine is to be hand-controlled, a governor 32 may be arranged as by a connection 33 to control the contactor arm 34 of the field resistance 1 of the generator, responsive to the speed of the generator as by a connection 35 arranged to drive the governor 32.

Operation will be as follows assuming the parts as indicated, the engine running at idling speed, the clutch C released, the reverse gear R in neutral position, the controller 13 maintaining the motor circuit open, and the wheels W, and consequently the vehicle, stationary. To advance the vehicle the reverse gear R is set for forward operation, by shifting its lever 11. The clutch C is next engaged by manipulation of the lever 9, preceded by opening of the throttle 16 either at least sufficiently to prevent stalling of the engine or entirely, to release the engine to the control of the governor 25. Engagement of the clutch causes the engine to drive the input element 3 of the differential D. The element 7 of the differential is fixed against reverse rotation, by the one-way clutch 14. Consequently the differential output element 4 is driven at low speed through the gears 5, pinions 6 and their connecting shafts 8. This low speed drive is transmitted to the wheels W through the reverse gear, drive shaft and axle, and the vehicle consequently advances, positively driven directly from the engine through the speed reduction provided by the differential under the described condition. There is no expenditure of energy driving the generator, as there is no load on the latter, the motor M being disconnected. The clutch C being engaged the wheels will turn and the vehicle advance at a speed in direct proportion to the engine speed.

Ultimately the engine speed increases, as the vehicle gets under way, and unless the throttle means is sooner closed. When the vehicle speed has increased to a point where the motor M may effectively act, the governor 27, being responsive to vehicle speed, automatically moves the contactor 30 of the motor controller 13, to connect the motor with the generator, with the controller resistance in circuit. The motor then drives the second differential input element 7 to increase the speed of the differential output element 4 more than proportionally to that of the input element 3. The drive from engine to wheels is now partly by way of the generator G, motor M and differential D, as well as from the engine by way of the clutch C and the differential. As the vehicle speed is thus caused to increase, the governor 27 gradually shifts the controller 13 to cut out resistance from the motor circuit, until ultimately the motor is connected directly with the generator with no resistance in circuit. By this time the motor speed has increased up to the point where its input element 7 of the differential is rotating at substantially the speed of the input element 3 of the differential so that all of the differential gears are stationary with respect to each other, all moving as a unit about the common center.

Meanwhile the generator voltage has been maintained by the governor 32 acting upon the field controller 1. Also the engine speed has attained that permitted by the governor 25 or the hand throttle means. In the former event the drive from engine to wheels is now substantially direct, the shaft 12 moving at engine speed. In the latter event the vehicle is moving as fast as permissible at that engine speed and load condition.

This running condition is substantially maintained so long as the engine throttle 16 is maintained open. If the vehicle meet with increased resistance to locomotion as on ascending a hill, the motor M, having series characteristics, will be slowed down somewhat and the differential gearing will permit some slip, allowing the engine to continue running and maintain the vehicle in locomotion. If the vehicle speed is materially decreased by this action of the differential the governor 27 will reset the controller 13 to prevent overloading of the motor M, and maintain the differential action proper for best efficiency of both engine and motor. If the vehicle slows sufficiently, the motor will be automatically cut out of circuit, releasing the engine to drive the load wholly mechanically.

Also, should the load resistance decrease, as on descending a hill, the engine speed may be reduced by manipulation of the throttle without functioning of the governor 27 to cut resistance into the motor circuit, provided the vehicle speed be maintained.

At any time the vehicle speed may be reduced by closing the hand throttle 16 to reduce the engine speed.

Operation in reverse will obviously be the same except that the lever 11 will be set in reverse position before engagement of the clutch C.

It will be observed that so far as the operator is concerned, once the reverse gear is set for the desired direction of travel, all that is necessary to govern the vehicle speed, is manipulation of the hand throttle 16, and in any event in starting, once the clutch C is engaged drive will be first positive and thence partly electrical, automatically dependent upon relation of engine speed to the load.

In the modification of Fig. 2, the general arrangement of the principal parts is similar to that indicated in Fig. 1 with the exception that the engine speed is maintained constant, wholly under governor control, the motor controller is arranged for manual instead of governor operation, and a common handle is provided for operating both the controller and the clutch C. It, therefore, being understood that parts and arrangement not appearing in Fig. 2 are the same as those appearing in Fig. 1, the clutch C is arranged for operation by a lever 40, pivoted at 41, and is normally maintained in engagement as indicated by the compression spring 42. A handled lever 43 pivotally mounted at 41 has a part 44 adapted to engage the clutch lever 40 for clutch-releasing actuation of the latter against the effect of the spring 42. The lever 43 is free to move in the opposite direction, beyond the lever 40 in that position thereof in which the clutch is engaged. The lever 43 is connected with the generator-controller line 45 and arranged to make contact with the resistance 46 which in turn has connection in line 47 in the generator-controller-motor circuit. In other words, the relation between the lever 43 and the resistance 46, and the effect on the generator-motor circuit is the same here as the relation of the contactor 30 and cooperative resistance of the controller 13 in Fig. 1, and effect of the controller on the generator-motor circuit of Fig. 1. The proportion and arrangement of the parts in Fig. 2 is such that the lever 43 does not make contact with the resistance 46 until after the clutch C is engaged.

Operation of the arrangement of Fig. 2 will thus be as follows, commencing with the parts in the positions indicated, the clutch C disengaged by its lever 40 and the motor disconnected from the generator by the lever 43 removed from the resistance 46; and otherwise assuming the parts as in Fig. 1.

The engine running at its fixed speed and the reverse gear R set in forward or reverse position, manipulation of the lever 43 downwardly, Fig. 2, first releases the movable clutch member to the action of spring 42 and permits engagement of the clutch. Since the motor M is secured against reverse rotation by the overrunning clutch 14, the load shaft 12, through the reverse gear R, will have drive at reduced speed by way of the differential D, and this drive will be positive and in fixed ratio with engine speed, as before described in connection with Fig. 1. Such conditions will prevail until the operator advances the lever 43 onto the resistance 46. This will not affect the clutch, which is engaged, but will cut the motor M into circuit with the generator G, subject to the resistance 46. The motor will thus be caused to drive its differential input element at slow speed, but nevertheless the differential D will, in effect, add such speed to that at which the shaft 12 was rotated before, when only the clutch C was engaged. Further advance of the lever 43 to eventually cut out all of the resistance 46 and place the motor directly across the generator to receive the full output of the latter, will, by speeding up the motor M, ultimately cause the corresponding differential input element 7 to revolve at the same speed as the engine E, at which time the load shaft 12 will be driven at the same speed.

Thereafter, adjustment of the lever 43 in the opposite direction will first cut corresponding parts of the resistance 43 into the motor circuit, causing the load to be driven at correspondingly reduced speeds. Still further motion of the lever will first stop the motor M and then release the clutch C and bring the load shaft 12 to a standstill.

As stated, with the arrangement of Fig. 2 the engine E is preferably governed as to speed as by a governor such as that shown at 25 and throttle at 26, Fig. 1; in which event, all that the operator need do to control the speed of the load shaft 12, and thus that of the vehicle, if the device be applied to a vehicle, is to adjust the lever 43 to give him the desired speed. It will be observed that in general the arrangement of Fig. 2 is comparable with that of Fig. 1, the significant differences being two only, first that, in Fig. 2, setting of the motor controller is manual instead of automatic as before, so that the speed of the motor is directly controlled by the operator; both the clutch and the motor controller have a common operator-operated member for their control; and the engine speed is maintained constant.

With reference now to Fig. 3, the principal parts, comprising the engine E, generator G, clutch C, differential D and motor M, are present as before, and their arrangement and relation are also as before, except as hereinafter noted, to drive the load shaft 12. The connection of the motor with the generator is subject to a controller 50 having a contactor arm 51 adjustable over a resistance 52, as indicated. The control arrangement is such that the contactor 51, even in its lowest speed position, which is that shown, makes contact with the resistance 52, so that so far as this controller is concerned, the motor M is always inserted with the generator G. However, that the connection between the motor and generator be also dependent upon the clutch C, switch means are provided in the generator-motor circuit and arranged to be closed only during engagement of the clutch C. Such switch means are here indicated as contactors 53 arranged to be bridged by the clutch control lever 54 when the latter is shifted to engage the clutch. The arrangement is such that when the clutch control lever 54 is shifted to disengage the clutch, which is the position in which these parts are shown, the generator-motor circuit will be open between the contactors 53.

A governor 55 similar to governor 27, is arranged to be responsive to the speed of the load shaft 12, as by connection 56, and has actuating connection, as indicated at 57, with the contactor lever 51 of the controller 50; the proportion and arrangement of the parts being such that when the load shaft 12 is stationary, the governor 55 will automatically position the contactor arm 51 to maintain all of the resistance 52 in circuit, and when the shaft 12 is running at the maximum speed of the engine E, which is assumed to be limited by a governor as indicated at 58, the contactor arm 51 will be positioned at the opposite end of the resistance 52 to complete the motor circuit without the resistance; intermediate speeds of the shaft 12 producing corresponding intermediate settings of the contactor arm 51.

The operation of the modification of Fig. 3 will be as follows, assuming the engine operating at the speed permitted by its governor 58 and the clutch C disengaged. No parts of the differential are in motion and the load shaft 12 is stationary or without drive. To start driving the load, the operator simply shifts the clutch control lever 54 to engage the clutch C and complete the circuit of the motor M by closing the circuit between the contactors 53. Engagement of the clutch C causes actuation of the input element 3 of the differential D coincidentally. The load shaft 12 being stationary and presumably connected with a load; its tendency is to resist actuation of the output element 4 of the differential, and consequently the other differential input element 7 tends to drive the motor M backwards.

However, coincidental with engagement of the clutch C, the motor is connected in circuit with the generator G, the circuit including all of the resistance 52. The proportion and arrangement of the parts is such that under these conditions the torque of motor M will provide sufficient braking power against being driven by its differential input element 7, that the element 7 is either held substantially stationary or backed against the motor at a reasonably low speed. In any event, with the described forces on the two input elements 3 and 7 of the differential, the output element 4 will be driven in the ahead direction, to set the load shaft 12 into motion.

As the speed of the load shaft increases, the governor 55 shifts the contactor arm 51 of the controller 50 to cut out resistance 52 proportionally with the speeding up of the load shaft; until ultimately, if sufficient engine speed be maintained, all of the resistance is out of the motor circuit, and the motor is directly across the generator line. Meanwhile the motor armature, starting with its backward operation, has first come to a standstill and thence come to such a running speed in ahead direction that its differential input 7 is driven ahead at substantially the speed of the other differential input element 3. Thus all of the differential parts have the same speed, namely that of the engine, as does the load.

To reduce the load speed, the engine speed is reduced by closing the hand throttle 16 as necessary.

To stop the load, the operator simply shifts the lever 54 to release the clutch C and open the circuit at 53. By this operation, drive of both input elements of the differential is terminated and the load shaft consequently still at a standstill.

With reference now to the modification of Fig. 4, the arrangement generally follows that of Fig. 3 with the exception that the control of the motor M is had indirectly, through control of the generator output. The generator G has an associated controller 60 for adjustment of its shunt field exitation, by which the generator output is controlled as well understood in the art. The motor M has direct connection with the generator through a circuit which in itself has no immediate control, the control being wholly in the low voltage field circuit.

The setting of the generator field controller 60 may be by hand, but is here shown as controlled by a governor 61 similar to governors 27 and 55, responsive to the speed of the load shaft 12, as by connection 62, and associated with the contactor of the controller 60, as by connection 63. The controller 60 is unable to open the circuit in which it is arranged, but merely controls how much, if any, resistance is in the circuit.

Contactors 64 are arranged in the generator-motor circuit to be bridged to complete the motor circuit dependent upon the position of the lever 65 which controls the clutch C, all as more fully described in connection with Fig. 3. The controller 60 being arranged for automatic operation by the governor 61, the engine E is provided with a hand throttle 16.

Operation, so far as the operator is concerned, is exactly as in the arrangement of Fig. 3. Start and stop of the load shaft 12 is controlled wholly by manipulation of the clutch control lever 65; and ultimate speed of the load, once started, is controlled by the engine. Acceleration of the load up to the speed permitted by the engine, is wholly automatic; and the speed to which the load will be accelerated and the rate of acceleration, depends of course upon the amount of the load as well as the engine speed. The greater the engine speed, the greater will be the load speed attained, but the greater the load the less will be the speed attained.

In the embodiments of both Figs. 3 and 4, the control of coupling between generator and motor is automatic, and that of the engine is by hand. An alternate arrangement would be, following that shown in Fig. 2, providing a fixed engine speed by governor control, and hand setting of the electrical control between motor and generator. Such choice would similarly be available in the embodiment of Fig. 1.

In fact, such choice will be dictated by the installation to which the invention is applied. In general, where great loads are to be driven at low speeds, as in heavy-duty slow moving vehicles, it may usually be preferable to employ hand control of the generator-motor drive, and governor control of the engine to maintain its speed constant. Correspondingly, where light loads are to be driven at high speeds and particularly with maximum rate of acceleration, as in pleasure automobiles, it will be preferable that the electrical connection between generator and motor be automatically controlled responsive to the speed of the load as hereinbefore described, and the engine speed, and consequently the running speed of the vehicle, be controlled by adjustment of its throttle at the will of the operator as by the usual accelerator pedal.

Also, the low voltatge control of the generator-motor connection by control of the generator field, with direct high voltage connection between motor and generator, as illustrated in Fig. 4, might be substituted in the arrangements of Figs. 1 and 2 similarly as Fig. 4 shows it substituted for that in Fig. 3.

What I claim is:

1. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor to the other of said input elements, and means independent of the motor driving connections, for automatically opposing drive of said motor-driven input element by either of the other differential elements.

2. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine and including clutch means, a driving connection from said motor means to the other of said input elements, and means independent of the motor driving connections, providing that opposition to drive of said motor driven input element by the other differential elements shall automatically follow engagement of said clutch means.

3. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor means to the other of said input elements, and means independent of the motor driving connections, for automatically opposing drive of said motor driven input element in reverse direction by the other differential elements.

4. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor means to the other of said input elements, and means independent of the motor driving connections, associated with said motor driven input element to prevent its drive in reverse direction by the other differential elements.

5. In combination with an engine, a generator driven thereby, and a motor arranged to be driven by the generator, differential means having a pair of input elements and an output element arranged to be differentially driven thereby, means for driving one of said input elements from said engine and including clutch means, a driving connection from said motor means to the other input element, means for controlling the drive of said motor by said generator, and means associating said clutch means with said controller and providing that power be supplied said motor from said generator automatically upon engagement of said clutch means.

6. In combination with an engine, a generator driven thereby, a motor arranged to be driven by the generator, differential means having a pair of input elements and an output element arranged to be differentially driven thereby, means for driving one of said input elements from said engine, said motor means being arranged to drive the other of said input elements, means preventing drive of said motor by said engine by way of said differential means, means for controlling the drive of said motor by said generator, and means for operating said controlling means responsive to the speed of said output element and arranged to deenergize said motor at output element speeds below a predetermined minimum.

7. In a vehicle having engine means and traction means to be driven thereby, generator means driven by said engine means, motor means arranged to be driven by said generator means, differential drive means for said traction means arranged in differentially driven relation with said engine means and with said motor means, and means independent of the motor driving connections, for automatically opposing drive of said motor means through said differential drive means coincident with drive of said differential drive means from said engine means.

8. In a vehicle having engine means and traction means to be driven thereby, generator means driven by said engine means, motor means arranged to be driven by said generator means, differential drive means for said traction means arranged in differentially driven relation with said engine means and with said motor means, and means independent of said generator means and of the motor driving connections, for preventing drive of said motor means through said differential drive means.

9. In a vehicle having engine means and traction means to be driven thereby, generator means driven by said engine means, motor means arranged to be driven by said generator means, means for controlling said motor drive, differential drive means for said traction means arranged in differentially driven relation with said engine means and with said motor means, means providing drive of said traction means from said differential drive means, means for adjusting said controller means automatically responsive to the speed of said traction means, to permit said motor drive only at vehicle speeds above a predetermined minimum, and means for opposing drive of said motor by said engine through said differential drive means.

10. In a vehicle having engine means and traction means to be driven thereby, generator means driven by said engine means, motor means arranged to be driven by said generator means, means for controlling said motor drive, differential drive means for said traction means arranged in differentially driven relation with said engine means and with said motor means, clutch means for controlling the engine drive of said differential drive means, means for adjusting said motor controller means automatically responsive to the speed of said traction means, and means interassociating said clutch means with the motor circuit to cause motor energization substantially coincident with clutch engagement.

11. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor to the other of said input elements, and means independent of said generator and of the motor driving connections, for automatically opposing drive of said motor-driven input element by the other differential elements.

12. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor to the other of said input elements, and means independent of electrical coupling between said generator and said motor and independent of the motor driving connections, for automatically opposing drive of said motor-driven input element by the other differential elements.

13. In a vehicle having engine means and traction means to be driven thereby, generator means driven by said engine means, motor means arranged to be driven by said generator means, differential drive means for said traction means arranged in differentially driven relation with said engine means and with said motor means, and means independent of the motor driving connection, for preventing drive of said motor means through said differential drive means coincident with drive of said differential drive means from said engine means.

14. In a vehicle having engine means and traction means to be driven thereby, generator means driven by said engine means, motor means arranged to be driven by said generator means, means for controlling said motor drive, differential drive means for said traction means arranged in differentially driven relation with said engine means and with said motor means, clutch means for controlling the engine drive of said differential drive means, and means interassociating said clutch means with the motor circuit to cause motor energization substantially coincident with clutch engagement.

15. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor to the other of said input elements, and one-way clutch means arranged to prevent drive of said motor-driven input element by the other differential elements.

16. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor to the other of said input elements, and a one-way clutch associated with said motor to prevent its drive by its input element in reverse direction.

17. In combination with an engine, a generator driven thereby, a motor arranged to be driven by the generator, means for controlling the drive of said motor from said generator, differential means having an output element and a pair of input elements arranged for differential drive thereof, means for driving one of said input elements from said engine, a driving connection from said motor to the other of said input elements, and a one-way clutch associated with said differential means to prevent drive of said motor-driven input element by the other differential elements.

FRANK R. HIGLEY.